United States Patent [19]
Takemura et al.

[11] 4,051,098
[45] Sept. 27, 1977

[54] METHOD OF PREPARING SHAPED ACTIVE CARBON

[75] Inventors: Takeshi Takemura; Yoshihisa Katoh, both of Hamamatsu; Shigeyuki Kurita, Fukuroi; Susumu Sasaki, Fujieda; Kyohei Funabiki, Fujieda; Keizo Hatano, Fujieda, all of Japan

[73] Assignees: Sumitomo Durez Company, Ltd., Tokyo; Daiichi Tanso Kogyo KK, Fukuroi, both of Japan

[21] Appl. No.: 709,985

[22] Filed: July 30, 1976

Related U.S. Application Data

[63] Continuation-in-part of Ser. No. 491,188, July 24, 1974, abandoned, which is a continuation of Ser. No. 335,608, Feb. 26, 1973, abandoned, which is a continuation-in-part of Ser. No. 129,137, March 29, 1971, abandoned.

[30] Foreign Application Priority Data

Apr. 2, 1970   Japan .................................. 45-27632

[51] Int. Cl.$^2$ ................................................ C08K 3/04
[52] U.S. Cl. ..................................... 260/38; 252/444; 252/445
[58] Field of Search .................. 260/38; 252/444, 445; 106/278, 284

[56] References Cited

U.S. PATENT DOCUMENTS 3,960,761   6/1976   Bürger et al. ......................... 252/445
4,009,143   2/1977   Luhleich et al. ......................... 260/38

Primary Examiner—Sandra M. Person
Attorney, Agent, or Firm—Peter F. Casella; Howard M. Ellis; James F. Mudd

[57] ABSTRACT

This invention relates to a process for manufacturing a shaped active carbon by using a one step phenol-formaldehyde resin, a modified phenol-formaldehyde resin or a mixture thereof as a binder. By this method, a shaped active carbon can be obtained having increased mechanical strength without deterioration of the adsorption capacity.

10 Claims, No Drawings

METHOD OF PREPARING SHAPED ACTIVE CARBON

REFERENCE TO PRIOR APPLICATION

This is a continuation-in-part of copending application Ser. No. 491,188, filed July 24, 1974, now abandoned which in turn is a continuation of copending application Ser. No. 335,608, filed Feb. 26, 1973, now abandoned, which is a continuation-in-part of copending application Ser. No. 129,137, filed Mar. 29, 1971, now abandoned.

BACKGROUND OF THE INVENTION

This invention relates to a process for manufacturing an active carbon formed into a granular or other suitable shapes by using a phenolic resin as a binder.

Recently, demand for active carbon has extended even to the field of desulphurization of smoke exhausted from a boiler and of water treatment, and is rapidly increasing in parallel with the emergent progress of public pollution preventive measures. An active carbon for these uses is required such as can be formed in a granular or other suitable shape having excellent adsorption capacity and erosion resistance in addition to low production cost.

Among granular active carbons supplied so far, there have been available those pillar-shaped ones 2-5 mm. in diameter obtained by an extrusion with tar, pitch, molasses, waste liquor of sulfite pulp or lignin used as a binder, or those of specified standard sizes obtained by merely grinding and sieving e.g., a cocoanut shell active carbon as it is without using any binder. These are all limited in their practicabilities inview of their shapes, dimensions and mechanical strengths and cannot fulfill the requirements for adsorption treatment on a large scale.

A granular active carbon, one typical example of formed active carbons, is packed in a tower to form an adsorbent layer and thus performs the required selective adsorption when gas, vapor or liquid passes through the said layer. In the case of a large quantity treatment, the granular active carbon should have a high adsorption capacity and, at the same time, be able to withstand the heavy weight of stacked layers. Moreover, it should be immediately durable enough to withstand even the wear resulting from its continuous use. It is also desired that the granule itself should be high in density so that the volume of the adsorbent layer in the packed tower, can be small.

Generally speaking, however, if the adsorption capacity of an active carbon is to be increased, it usually requires lowering of its mechanical strength, dimension and density, which so far could not but limit the conventional active carbon considerably in its manufacture and use. That is, it was unavoidable that, if the bulk density of a granule was too high at the granule formation stage, it was difficult to activate the granule, thus lowering its adsorption capacity and if the adsorption capacity was increased at the activation stage, the granular active carbon obtained was necessarily too bulky and unavoidably reduced in mechanical strength. In consequence, there was no alternative but to compromise the mechanical strength and the adsorption capacity at the cost of both properties to some extent.

The object of this invention is to provide a shaped active carbon in a granular or other suitable shape which is excellent both in mechanical strength and adsorption capacity and is, moreover, high in erosion resistance.

This object can be attained by using a one step phenolformaldehyde resin, a furfural-modified phenol resin, or mixtures thereof (these resins are generically referred to as "phenolic resins" hereinafter).

DETAILED DESCRIPTION OF THE INVENTION

It is well known that these resins have high binding power. However, from past experience with water soluble infinitely dilutable resins, as a class, when used as binders for shaped active carbon, the activated surfaces of the active carbon covered with this class of resin was interrupted, resulting accordingly in a partial or almost total loss of activity. Research work of this type has been totally ignored so far. However, as a result of researches and investigations on a number of binders by the inventors, it was found that, of the many types of resins, the above specific phenolic resins claimed herein could be used, contrary to general anticipation, as a binder without damaging the adsorption capacity of an active carbon at all.

The active carbon formed using the above phenolic resins is not only remarkably higher in binding strength and accordingly in mechanical strength than the conventional active carbons, but also is better in heat resistance, withstanding uses at high temperatures. It is also resistant to acids and alkalis and so can be applied to a wide range of uses. The fact that these resins do not damage the adsorption property of an active carbon is thought attributable to their markedly high carbonization rates in the high temperature treatment at the activation time or after the shaping time.

There are two processs for shaping. The first process consists in the addition of a phenolic resin to ground inactive carbon material such as charcoal, cocoanut shell carbon, anthracite or grass peat for subsequent shaping of such a mixture into a suitable shape and then in the activation of its by treating with steam to obtain a shaped active carbon. The second process consists in the addition of a phenolic resin to a powdered active carbon preliminarily activated for subsequent formation of such a mixture into a suitable shape and then in drying and hardening it to obtain a shaped active carbon.

More detailed processs of manufacturing shaped active carbons from a granular active carbon, will be described as follows. In the first process, a phenolic resin and a carbon material ground so fine as to all pass through a sieve of about 80 mesh are mixed at a suitable ratio of 1:10 to 1:2 by weight, and when necessary, after an appropriate amount of water is added to the above mixture and mixed, then made into granules. These granules so obtained are heated and dried at a suitable temperature ranging from 70° C to 150° C during 0.5 to 5 hours for hardening. They are preferably baked further at 120° C to 150° C for 5 to 24 hours. It is also possible to harden the granules at room temperature, if they are left standing for more than 24 hours, in which case, appropriate amounts of acid and water are added at the time of mixing the phenolic resin and the carbon material. When the steam activation is conducted by the usual procedure after hardening o the granules, a shaped active carbon can be easily obtained.

In the second process, a phenolic resin and a preliminarily activated powdered active carbon, all passing through an 80 mesh sieve are mixed at a suitable ratio of 1:10 to 1:2 by weight and, when necessary, after an appropriate amount of water is added to the above mixture it is made into granules. These granules obtained are heated and dried at a suitable temperature in the range from about 70° C to about 150° C for about 0.5 to about 5 hours to be hardened. They are preferably baked further at about 120° C to about 150° C for about 5 to about 24 hours. As in the first process, it is also possible to harden the granules at room temperature. Thus, a shaped active carbon can be easily obtained.

The comparative mechanical strength (compressive strength) of the granular active carbon produced by the process in this invention (as shown in Example 1) and of the commercially available granular active carbon are given in Table 1. The mechanical strength is expressed in the collapsing kg. load per granule. That is, it represents the load when the individual granules of an active carbon were subjected to a compressive test with a compression speed of 1 mm. per minute of a 500 kg. capacity Air Micro Universal Tester (by Tokyo Weighing Machine Co., Ltd.).

Table 1.

| | Collapsing Strength of Granular Active Carbon (kg/granule) | |
|---|---|---|
| Test No. | Granular Active Carbon by the Process in this Invention | Commercially Available Granular Active Carbon |
| 1 | 50 | 7 |
| 2 | 48 | 8 |
| 3 | 50 | 5 |
| 4 | 30 | 5 |
| 5 | 35 | 7 |
| 6 | 49 | 10 |
| 7 | 34 | 10 |
| 8 | 55 | 7 |
| 9 | 46 | 8 |
| 10 | 38 | 6 |
| Average | 44 | 7 |

As is clear from Table 1, the granular active carbon obtained by the process of this invention has 6 to 7 times more collapsing strength than the general granular active carbons commercially available.

Likewise, the bulk density and the adsorption capacities of the granular active carbon produced by the process in this invention (as shown in Example 1) and of the commercially available granular active carbon are compared in Table 2. With respect to the adsorption capacity, dry air saturated with benzene at 20° C is passed through 10 grams of a sample of active carbon at the speed of 400 ml. per minute in order to adsorb the saturated benzene there. Thus, the adsorption capacity is expressed in weight % of the original sample.

Table 2.

| | Bulk Density and Adsorption Capacity of Granular Active Carbon | | | |
|---|---|---|---|---|
| | Granular Active Carbon by the Process in this Invention | | Commercially Available Granular Active Carbon | |
| Test No. | Bulk Density | Adsorption Capacity % | Bulk Density | Adsorption Capacity % |
| 11 | 0.65 | 37.5 | 0.40 | 34.0 |
| 12 | 0.70 | 30.2 | 0.38 | 38.8 |
| 13 | 0.58 | 39.5 | 0.45 | 31.5 |
| 14 | 0.68 | 35.5 | 0.51 | 28.3 |
| 15 | 0.72 | 30.8 | 0.48 | 27.4 |
| Average | 0.67 | 34.7 | 0.44 | 32.0 |

As is evident from Table 2, the granular active carbon obtained by the process of this invention has about 1.5 times as high a bulk density as the general granular active carbons commercially available and, moreover, an adsorption capacity 10% higher than these active carbons.

The above description has been mainly concerned with the manufacture of a granular active carbon. However, it is a matter of course that the process in this invention is not limited to the shaping of granules of an active carbon but also can be applied to the manufacture of a shaped active carbon having arbitrary shapes. Recently, a new process for using an active carbon has been devised in which large-sized, specially shaped active carbon of a spherical, laminar or cylindrical shape is charged in an adsorber as a convenient replacement for used active carbon. Such a convenient shaped active carbon is in demand now. Such a shaped active carbon in a specific form can be produced easily by the process of this invention.

One of the features of the process in this invention is that a shaped active carbon can be manufactured easily and economically with simple equipment and an inexpensive binding agent and by an easy operation.

The present invention will be more fully appreciated from the following specific examples.

EXAMPLE 1

After 0.05 mol caustic soda combined with 1 mol phenol was added to a mixture of phenol and formalin (the mol ratio of phenol and formaldehyde = 1:2), this mixture was reacted at 80° C for 30 minutes, partial dehydration was carried out under a reduced pressure so that the solid content at 135° C would be 70%. The one step phenolic resin prepared in this way had a viscosity of 1.5 to 3.0 poises (at 25° C), a gelation time (at 135° C) of 10 to 20 minutes, solid content (at 135° C) was 65% to 70%. The resin was soluble in water at 25° C and its water tolerance, i.e., dilutability (at 25° C) was infinite.

This resin and a cocoanut shell carbon all passing through an 80 mesh sieve were mixed uniformly in a mixer at a ratio of 20:80 by weight and the mixture was then formed into spherical granules of 10 to 12 mm in diameter. The cured matter obtained by drying the shaped granules at 100° C for 2 hours in a drying oven was 0.78 in bulk density. Then, as a result of steam activation conducted on these dried and cured granules at 900° C for 3 hours, a granular active carbon featuring a bulk density of 0.67, benzene and $SO_2$ adsorption capacities of 34.7% and 20% respectively and a collapsing strength of 44 kg was obtained with an activation yield of 55%.

EXAMPLE 2

After 0.02 mol caustic soda combined with 1 mol phenol was added to a mixed solution of phenol and formalin (the mol ratio of phenol and formaldehyde = 1:1) and was reacted for 30 minutes at reflux, partial dehydration was carried out under reduced pressure. Then, by adding furfural to it, a furfural-modified phenolic resin was prepared. The properties of this resin were: viscosity of water solution, 3 to 5 poises (at 25° C), gelation time of 10 to 20 minutes (at 135° C) and 60% to 65% of solids content (at 135° C).

This furfural-modified phenolic resin and anthracite ground to all pass through an 80 mesh sieve were mixed uniformly at a ratio of 30:70 by weight and the mixture was then formed into spherical granules 10 to 12 mm in diameter. The cured matter obtained by drying the shaped granules at 120° C for 1 hour was 0.77 in bulk density. Then, as a result of steam activation conducted on these dried and cured granules at 900° C for 3 hours, a granular active carbon featuring a bulk density of 0.63, benzene and $SO_2$ adsorption capacities of 28.3% and 15%, respectively, and a collapsing strength of 38 kg was obtained with an activation yield of 50%.

EXAMPLE 3

After caustic soda was added to a mixed solution of phenol and formalin (the mol ratio of phenol and formaldehyde = 1:2.5), the solution was reacted for 30 minutes at reflux, partial dehydration was carried out under reduced pressure. After cooling, methanol was added to it to obtain a one step phenolic resin. The properties of this resin were: viscosity of 1 to 3 poises (at 25° C), gelation time of 10 to 20 minutes (at 135° C), 65% to 70% of solid content (at 135° C). The resin was soluble in water at 25° C and its water tolerance, i.e., dilutability (at 25° C) was infinite.

Aside from this, anthracite was preliminarily subjected to steam activation at 900° C for 3 hours and this active carbon ground so fine as to all pass through an 80 mesh sieve was mixed with the afore-mentioned one step phenolic resin at a ratio of 70:30 by weight. Further, water was added to it for uniform mixing. Then, this mixture was formed into spheres 12 mm in diameter. After these granules were dried and cured at 80° C for 3 hours, baking was conducted at 150° C for 20 hours for the production of granular active carbon, which featured a bulk density of 0.65, benzene and $SO_2$ adsorption capacities of 24% and 15% respectively and a collapsing strength of 25 kg.

EXAMPLE 4

After 2% weight of para-toluene sulfonic acid was added to a precondensate of a furan resin which was obtained by condensing furfural alcohol with an acid catalyst and had the properties of viscosity of 2 to 5 poises (at 25° C) and of solid content of 50% to 55% (at 135° C) and uniformly mixed, a cocoanut shell carbon ground so fine as to all pass through an 80 mesh sieve was further mixed at a ratio of 20:80 by weight. Then, it was formed into spherical granules of 10 to 22 mm in diameter.

These shaped granules which were then cured by allowing them to stand at room temperature for 24 hours had a bulk density of 0.78.

As a result of steam activation conducted on these curved granular materials, a granular active carbon featuring a bulk density of 0.66, benzene and $SO_2$ adsorption capacities of 32% and 18% respectively and a collapsing strength of 35 kg was obtained with an activation yield of 52%.

The invention can be practiced with curable or thermosetting resins such as phenol-aldehyde resins, including one step phenolaldehyde resins wherein ratio of phenol to aldehyde is in the range of 1:1 to 1:3, modified phenol-aldehyde resins, such as phenol-aldehyde resins of the foregoing type that have been modified with compounds such as furfural. The foregoing resins are prepared by methods known in the art. The aldehyde is preferably formaldehyde, but can be an aldehyde of up to 8 carbon stoms, such as acetaldehyde, propionaldehyde, butyraldehyde, benzaldehyde, 2-ethylhexanol, and the like.

What is claimed is:

1. A composition comprising active carbon particles and as a binder therefor a cured resin selected from the group consisting of a one-step phenolic resin and a furfural-modified phenolic resin wherein said resin is characterized by being soluble in water at 25° C prior to curing and is combined with said active carbon in a weight ratio from 1 part of said binder to 10 parts of said active carbon to 1 part of said binder to 2 parts of said active carbon.

2. The composition of claim 1 in which said granular active carbon is selected from the group consisting of charcoal, cocoanut shell carbon, anthracite and grass peat.

3. The composition of claim 1 consisting essentially of active carbon particles and as a binder therefor a cured furfural-modified phenolic resin.

4. The composition of claim 1 consisting essentially of active carbon particles and as a binder therefor a cured one-step phenolic resin.

5. The composition of claim 3 in which said active carbon is selected from the group consisting of charcoal, cocoanut shell carbon, anthracite and grass peat.

6. The composition of claim 4 in which said active carbon is selected from the group consisting of charcoal, cocoanut shell carbon, anthracite and grass peat.

7. A process for preparing a shaped object from a granular active carbon composition comprising:
   1. mixing with said granular active carbon a binding amount of a curable thermosetting resin beinder selected from the group consisting of a one-step phenolic resin and a furfural-modified phenolic resin, said resin having the property of solubility in water at 25° C,
   2. forming said shaped object from the mixture of said binder and granular carbon, and
   3. drying and curing said shaped object.

8. The process of claim 7 wherein said drying is accomplished at a temperature between room temperature and 150° C and wherein said curing is accomplished at a temperature between 120° C and 150° C.

9. The process of claim 8 wherein said resin binder is combined with said granular active carbon in a weight ratio from 1 part of binder to 10 parts of carbon to 1 part of binder to 2 parts of carbon.

10. The process of claim 9 wherein said resin binder and granular active carbon are of a particle size which permits said carbon and said resin binder to pass through an 80 mesh sieve.

* * * * *